(12) United States Patent
Kamiya et al.

(10) Patent No.: US 9,118,831 B2
(45) Date of Patent: *Aug. 25, 2015

(54) IMAGE PROCESSING APPARATUS AND CAMERA SYSTEM

(71) Applicant: INTERSIL AMERICAS LLC, Milipitas, CA (US)

(72) Inventors: Ryo Kamiya, Tokyo (JP); Takeshi Suzuki, Tokyo (JP)

(73) Assignee: Intersil Americas LLC, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/692,427

(22) Filed: Dec. 3, 2012

(65) Prior Publication Data

US 2013/0222532 A1 Aug. 29, 2013

Related U.S. Application Data

(63) Continuation of application No. 12/669,750, filed as application No. PCT/JP2008/062984 on Jul. 18, 2008, now Pat. No. 8,325,247.

(30) Foreign Application Priority Data

Jul. 20, 2007 (JP) ................................. 2007-189807

(51) Int. Cl.
*H04N 5/228* (2006.01)
*H04N 5/232* (2006.01)
*G06T 3/00* (2006.01)
*G08B 13/196* (2006.01)
(Continued)

(52) U.S. Cl.
CPC .............. *H04N 5/23238* (2013.01); *G06K 9/32* (2013.01); *G06T 3/0062* (2013.01); *G08B 13/1963* (2013.01); *G08B 13/19628* (2013.01); *H04N 5/2628* (2013.01)

(58) Field of Classification Search
USPC ......... 348/36, 222.1, 580; 382/123, 294, 298, 382/302, 293

See application file for complete search history.

(56) References Cited

U.S. PATENT DOCUMENTS 5,359,363 A * 10/1994 Kuban et al. .................... 348/36
5,691,765 A * 11/1997 Schieltz et al. ............... 348/335

(Continued)

FOREIGN PATENT DOCUMENTS

JP 6284424 A 10/1994
JP 2005286820 A 10/2005

*Primary Examiner* — Aung S Moe
*Assistant Examiner* — Amy Hsu
(74) *Attorney, Agent, or Firm* — Loza & Loza, LLP; Anthony G. Smyth

(57) ABSTRACT

An image processing apparatus or camera system comprises an image sensor 1, a geometrical position calculation device 6 for performing predetermined correction of a distortion, a first address table 10 for storing information correlating an input side address based on the calculation results of the geometrical position calculation device 6 to an output side address as a reference, a sort unit 11 for sorting the output side addresses according to the input side addresses, a second address table 12 for storing information correlating the output side address to the sorted input side address as a reference, and an address matching device 13 for matching the input side address of input side image data DI with the input side address stored in the second address table 12 and outputting output side image data DO.

15 Claims, 14 Drawing Sheets

(51) Int. Cl.
*H04N 5/262* (2006.01)
*G06K 9/32* (2006.01)

(56) References Cited

U.S. PATENT DOCUMENTS

| | | | |
|---|---|---|---|
| 6,345,129 B1 * | 2/2002 | Aharon | 382/284 |
| 6,865,028 B2 * | 3/2005 | Moustier et al. | 359/725 |
| 7,450,165 B2 * | 11/2008 | Ahiska | 348/240.2 |
| 7,505,068 B2 * | 3/2009 | Silverbrook | 348/222.1 |
| 7,773,772 B2 * | 8/2010 | Oizumi | 382/104 |
| 8,189,949 B2 * | 5/2012 | Akatsuka | 382/274 |
| 2005/0007478 A1 * | 1/2005 | Ahiska | 348/335 |
| 2006/0038895 A1 * | 2/2006 | Suzuki et al. | 348/222.1 |
| 2008/0175507 A1 * | 7/2008 | Lookingbill et al. | 382/255 |

* cited by examiner

FIG. 6
(a)
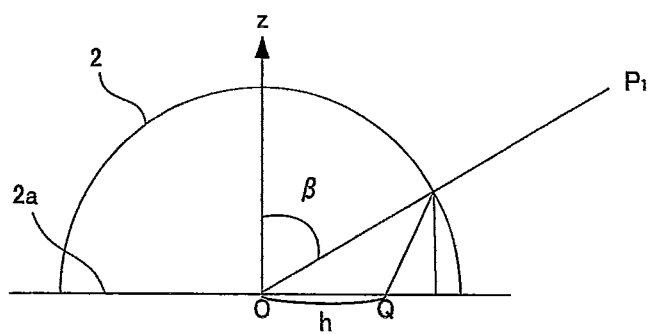
(b)
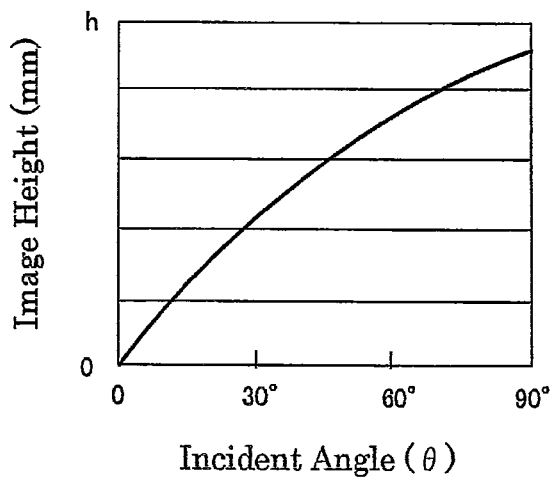
(c)
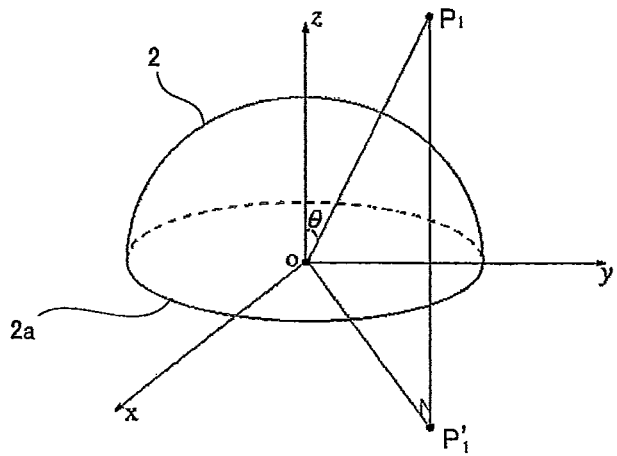

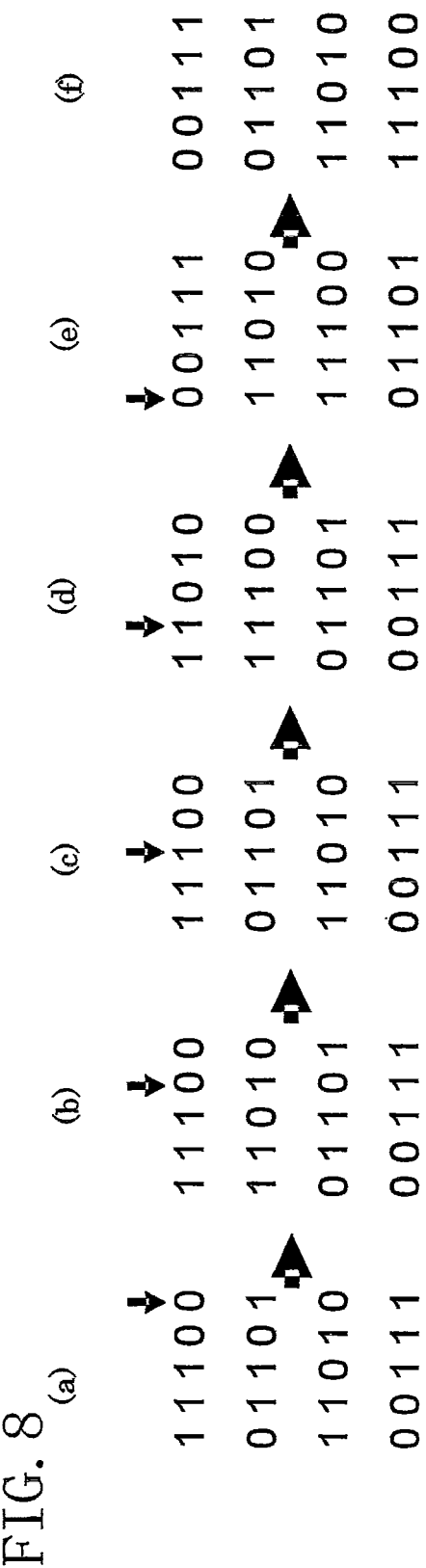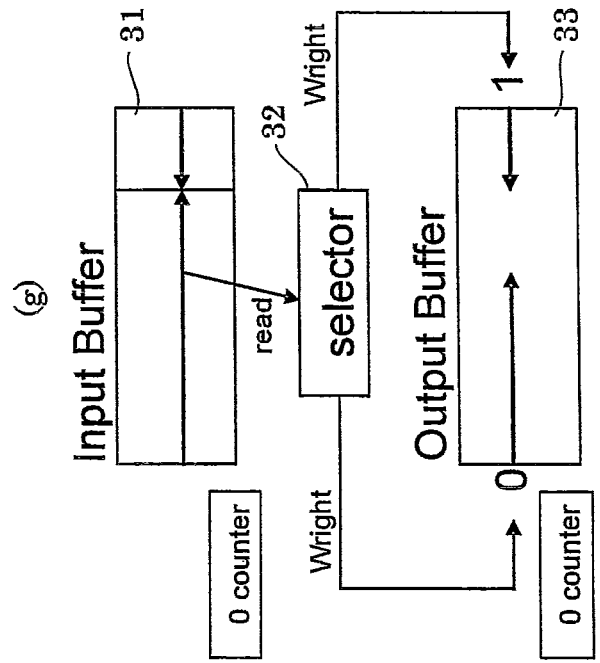
FIG. 8

FIG. 10
(a)
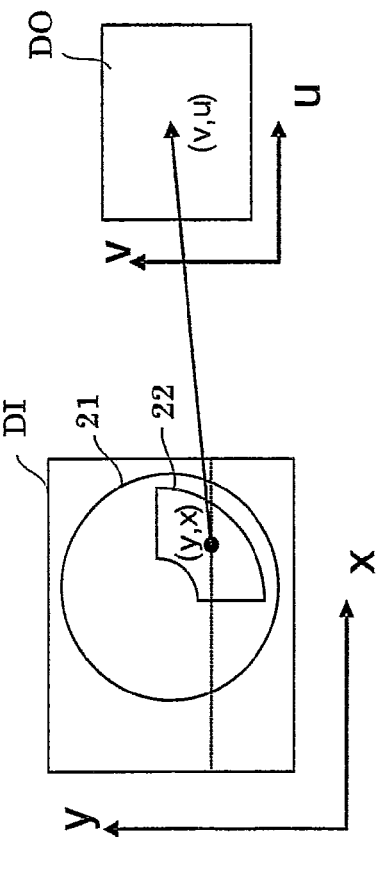
(b)
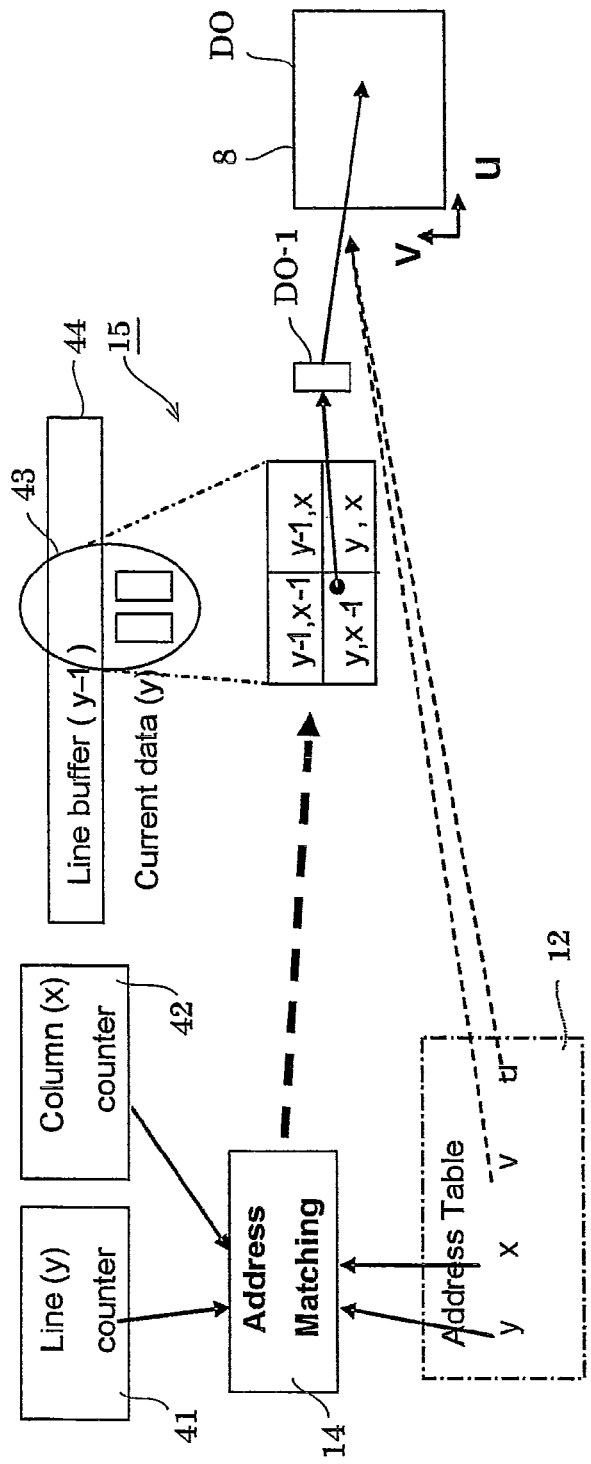

IMAGE PROCESSING APPARATUS AND CAMERA SYSTEM

CROSS-REFERENCE TO RELATED APPLICATION

This application is a continuation of co-pending U.S. application Ser. No. 12/669,750 filed Jan. 19, 2010, which is a national phase filing of PCT/JP2008/062984 filed Jul. 18, 2008, which claims priority to Japanese Application No. 2007-189807 filed Jul. 20, 2007, all of which are incorporated by reference herein in their entireties.

TECHNICAL FIELD

This invention relates to an image processing apparatus and a camera system. More specifically, the invention relates to those useful when applied to an image processing apparatus or an omnidirectional camera system which perform correction of a distortion when doing omnidirectional monitoring through a fish-eye lens, or an image processing apparatus or a camera system which perform processing for distorting a captured image.

BACKGROUND ART

A fish-eye lens is known as a lens having a wide-angle field of view or visual field. A proposal has been made for an omnidirectional camera system for monitoring a predetermined region with the use of this fish-eye lens. Such an omnidirectional camera system generally has functions such as panning, tilting, zooming (i.e., pan, tilt, zoom) and rotation (or rolling or roll). In recent years, a proposal has also been made for an omnidirectional camera system which, as compared with the conventional mechanical pan, tilt or zoom mode, electrically processes input side image data captured by the fish-eye lens, thereby fulfilling various functions, such as pan, tilt, zoom and rotation, and eliminating the distortion of the image, without moving the apparatus.

FIG. 14 is a block diagram of this type of omnidirectional camera system according to the conventional technology. As shown in this drawing, a CMOS image sensor 1, which is an imaging means, forms image data as an electrical signal based on a wide-angle image captured by a fish-eye lens 2. This image data is an electrical digital signal having a distortion component remaining as such when captured by the fish-eye lens 2. This signal is subjected to predetermined color processing at a color processing unit 3, whereby it is written into a frame memory 4 as input side image data DI having color information as well as luminance or brightness information.

A parameter setting device 5, on the other hand, has settings of parameters concerned with pan, tilt, zoom and rotation for cutting out a region to be displayed, in the image captured by the fish-eye lens 2, and parameters related to the center and radius of the fish-eye lens 2. That is, the parameter setting device 5 functions as an input/output device for these parameters. The parameters about the pan, tilt and rotation are set as angular information, the parameter about the zoom is set as magnification information, and the parameters about the center and radius of the fish-eye lens 2 are set as positional information and numerical information. A geometrical position calculation device 6 calculates the geometrical position of each pixel in the input side image data DI, which corresponds to each pixel on a display screen (output screen) 9a of a display device 9, in order to correct the distortion, by the fish-eye lens 2, of the image in the region to be cut out as output based on the parameters set in the parameter setting device 5.

An output side image data generation unit 7 forms output side image data DO corrected for the distortion based on the geometrical position of each pixel in the input side image data DI calculated by the geometrical position calculation device 6, and the input side image data DI stored in the frame memory 4. This output side image data DO is data obtained by sequentially combining brightness information, etc. based on the input side image data DI for each pixel on the output screen corresponding to the geometrical position. The output side image data DO is sequentially stored into a buffer memory 8, pixel by pixel, and is reproduced on the display screen (output screen) 9a of the display device 9 frame by frame. In this manner, the image in the predetermined cut-out region and corrected for distortion is reproduced on the display screen 9a.

As a publication which discloses a technology of the same type as that of the above-described conventional technology, the following patent document 1 is existent:

Patent Document 1: JP-A-2000-83242

With the above-described omnidirectional camera system, the input side image data DI, which is the output signal of the image sensor 1 as the imaging means, is written into the frame memory 4. After the writing of the input side image data DI corresponding to one frame is completed, the output side image data DO is formed by reference to the contents of storage in the frame memory 4. Thus, during such a series of processing steps, a time lag occurs. Such a time lag manifests itself as a display delay on the display screen 9a.

The present invention has been accomplished in the light of the above-described conventional technologies. It is an object of the invention to provide a camera system capable of achieving a series of processings, without using a frame memory, in the conversion of input side image data into output side image data, which involves predetermined processing of a geometrical position, such as correction of distortion of the input side image data.

SUMMARY OF THE INVENTION

A first aspect of the present invention for attaining the above object is an image processing apparatus, comprising:

parameter setting means which has a setting of a parameter concerned with at least one of pan, tilt, zoom and rotation for cutting out a region to be displayed in an image taken in by a lens;

geometrical position calculation means for calculating a geometrical position of each pixel in input side image data based on an output signal of imaging means, the each pixel corresponding to each pixel on an output screen, in order to perform predetermined transformation of a geometrical position of an image in the region based on the parameter;

an address table for storing table information which is combined information obtained by correlating an input side address, as an address of the each pixel of the input side image data based on calculation results of the geometrical position calculation means, to an output side address as a reference which is an address of the each pixel on the output screen; and address matching means which checks the input side address of the each pixel of the input side image data, loaded in real time, against the input side address stored in the address table, and when both input side addresses are coincident, combines the input side image data at the input side address with the corresponding output side address to form output side image data, and also sends out the output side image data.

A second aspect of the present invention is a camera system, comprising:

imaging means for forming a digital signal representing an image taken in by a lens;

parameter setting means which has a setting of a parameter concerned with at least one of pan, tilt, zoom and rotation for cutting out a region to be displayed in the image;

geometrical position calculation means for calculating a geometrical position of each pixel in input side image data, the each pixel corresponding to each pixel on an output screen, in order to perform predetermined transformation of a geometrical position of an image in the region based on the parameter;

an address table for storing table information which is combined information obtained by correlating an input side address, as an address of the each pixel of the input side image data based on calculation results of the geometrical position calculation means, to an output side address as a reference which is an address of the each pixel on the output screen; and address matching means which checks the input side address of the each pixel of the input side image data, loaded in real time, against the input side address stored in the address table, and when both input side addresses are coincident, combines the input side image data at the input side address with the corresponding output side address to form output side image data, and also sends out the output side image data.

A third aspect of the present invention is the camera system according to the second aspect, wherein the address table stores table information in which the output side addresses in the table information based on the calculation results of the geometrical position calculation means in connection with a specific region are rearranged according to the input side addresses.

A fourth aspect of the present invention is the camera system according to the third aspect, wherein the address table stores a plurality of pieces of table information in which the output side addresses are rearranged according to the input side addresses in connection with a plurality of the specific regions.

A fifth aspect of the present invention is a camera system, comprising:

imaging means for forming a digital signal representing an image taken in by a lens;

parameter setting means which has a setting of a parameter concerned with at least one of pan, tilt, zoom and rotation for cutting out a region to be displayed in the image;

geometrical position calculation means for calculating a geometrical position of each pixel in input side image data, the each pixel corresponding to each pixel on an output screen, in order to perform predetermined transformation of a geometrical position of an image in the region based on the parameter;

an address table for storing table information which is combined information obtained by correlating an input side address, as an address of the each pixel of the input side image data based on calculation results of the geometrical position calculation means, to an output side address as a reference which is an address of the each pixel on the output screen;

matching sort means for rearranging the output side addresses stored in the address table according to the input side addresses;

a matching address table for storing table information which is combined information obtained by correlating the output side addresses to the input side addresses upon rearrangement by the matching sort means; and address matching means which checks the input side address of the each pixel of the input side image data, loaded in real time, against the input side address stored in the matching address table, and when both input side addresses are coincident, combines the input side image data at the input side address with the corresponding output side address to form output side image data, and also sends out the output side image data.

A sixth aspect of the present invention is the camera system according to any one of the second to fifth aspects, wherein the geometrical position calculation means finds the input side address to decimal places, and outputs the input side address as a decimal value, and the address matching means uses, as a reference, a specific pixel corresponding to a whole number part of the input side address in the input side image data, finds brightness of the specific pixel by interpolation for weighting with a value of a fractional part of the input side address based on brightness of a plurality of pixels adjacent to the specific pixel, and takes the brightness of the specific pixel as brightness of a pixel in the output side image data corresponding to the specific pixel.

A seventh aspect of the present invention is the camera system according to the sixth aspect, wherein the address matching means has a buffer memory for storing at least one line equivalent of data, and is adapted to find the brightness of the specific pixel belonging to a next line by use of brightness information on each pixel stored in the buffer memory.

An eighth aspect of the present invention is the camera system according to the second to seventh aspects, further comprising a buffer memory for storing the output side image data, the buffer memory having the output side image data written randomly thereinto, with the output side address as a reference, each time results of the checking are coincident, and wherein readout of the output side image data is performed sequentially.

A ninth aspect of the present invention is the camera system according to the second to seventh aspects, further comprising a buffer memory for storing the output side image data, the buffer memory having the output side image data written sequentially thereinto each time results of the checking are coincident, further comprising read-out sort means for rearranging memory addresses of the buffer memory according to the output side addresses, and a read-out address table for storing table information which is combined information obtained by correlating the memory addresses to the output side addresses as a reference upon rearrangement by the read-out sort means, and wherein readout of the output side image data is performed randomly based on the table information of the read-out address table.

A tenth aspect of the present invention is the camera system according to any one of the second to ninth aspects, wherein the lens is a fish-eye lens having a wide-angle visual field, and the transformation in the geometrical position calculation means is processing for correcting distortion of the image in the region.

An eleventh aspect of the present invention is the camera system according to any one of the second to ninth aspects, wherein the transformation in the geometrical position calculation means is processing for distorting the image in the region.

According to the present invention, the input side address of each pixel of the input side image data, which has been loaded in real time, against the input side address stored in the address table. When both input side addresses are coincident, the input side image data at the input side address is combined with the corresponding output side address to form output side image data. Thus, there is no need for a frame memory as in the conventional technology, which stores the one frame equivalent of input side image data as output signals from imaging means.

Consequently, a delay due to the time for writing the one frame equivalent of image data into the frame memory can be eliminated, and the image taken in can be displayed promptly as a reproduced image. Such effects are remarkable, particularly, with a monitoring camera system or the like which targets a moving body as an object of imaging.

BRIEF DESCRIPTION OF THE DRAWINGS

FIGS. 6(a) to 6(c) are explanation drawings for illustrating image height characteristics in the fish-eye lens shown in FIG. 1;

FIGS. 8(a) to 8(g) are explanation drawings conceptually showing sorting in the sort unit shown in FIG. 1;

FIGS. 10(a) and 10(b) are explanation drawings conceptually showing the detailed configuration of an address matching device and a buffer memory shown in FIG. 1;

Embodiments of the present invention will now be described in detail based on the accompanying drawings.

FIRST EMBODIMENT

Figure 1:
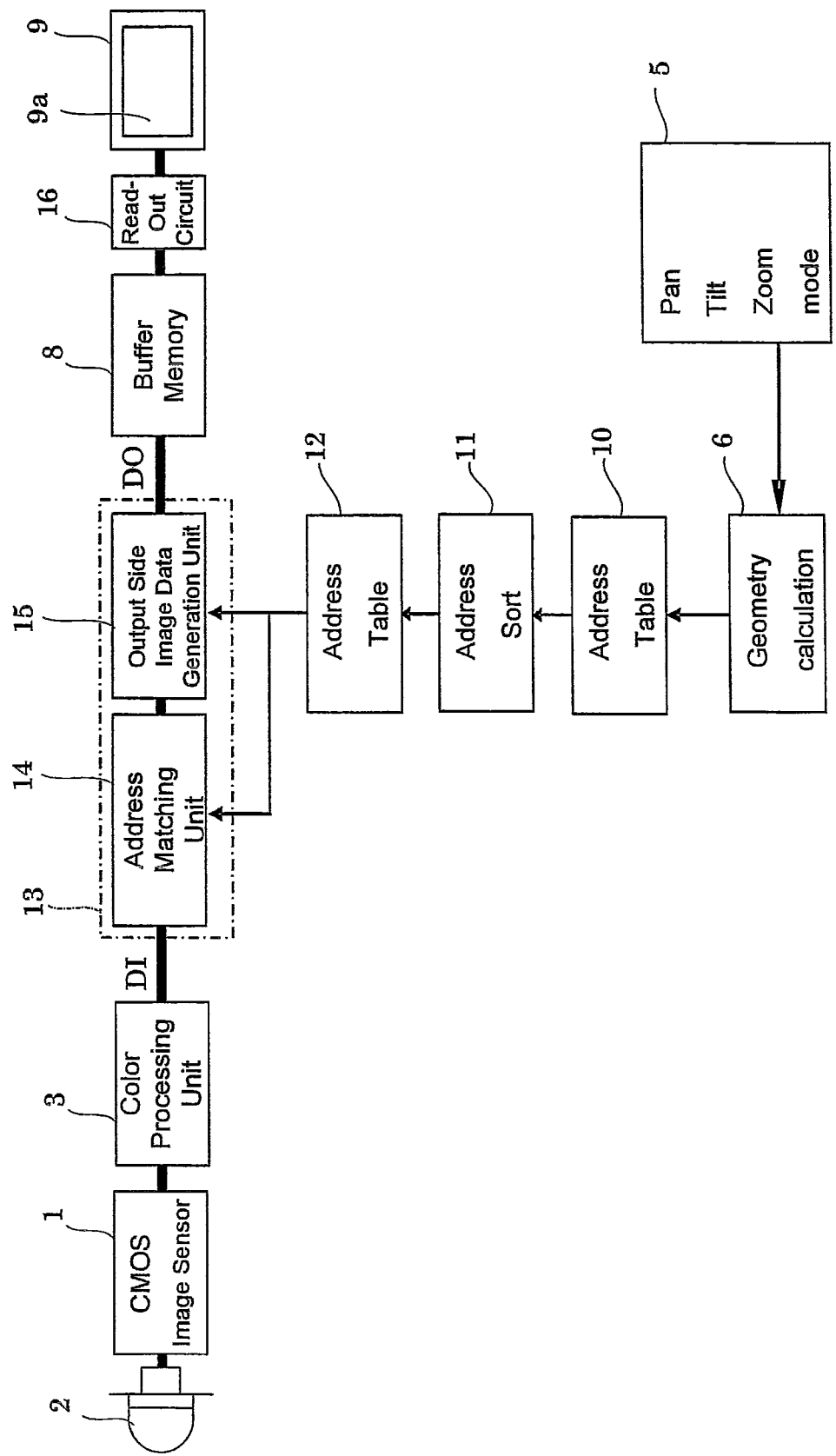
FIG. 1 is a block diagram showing an omnidirectional camera system according to a first embodiment of the present invention.
Figure 14:
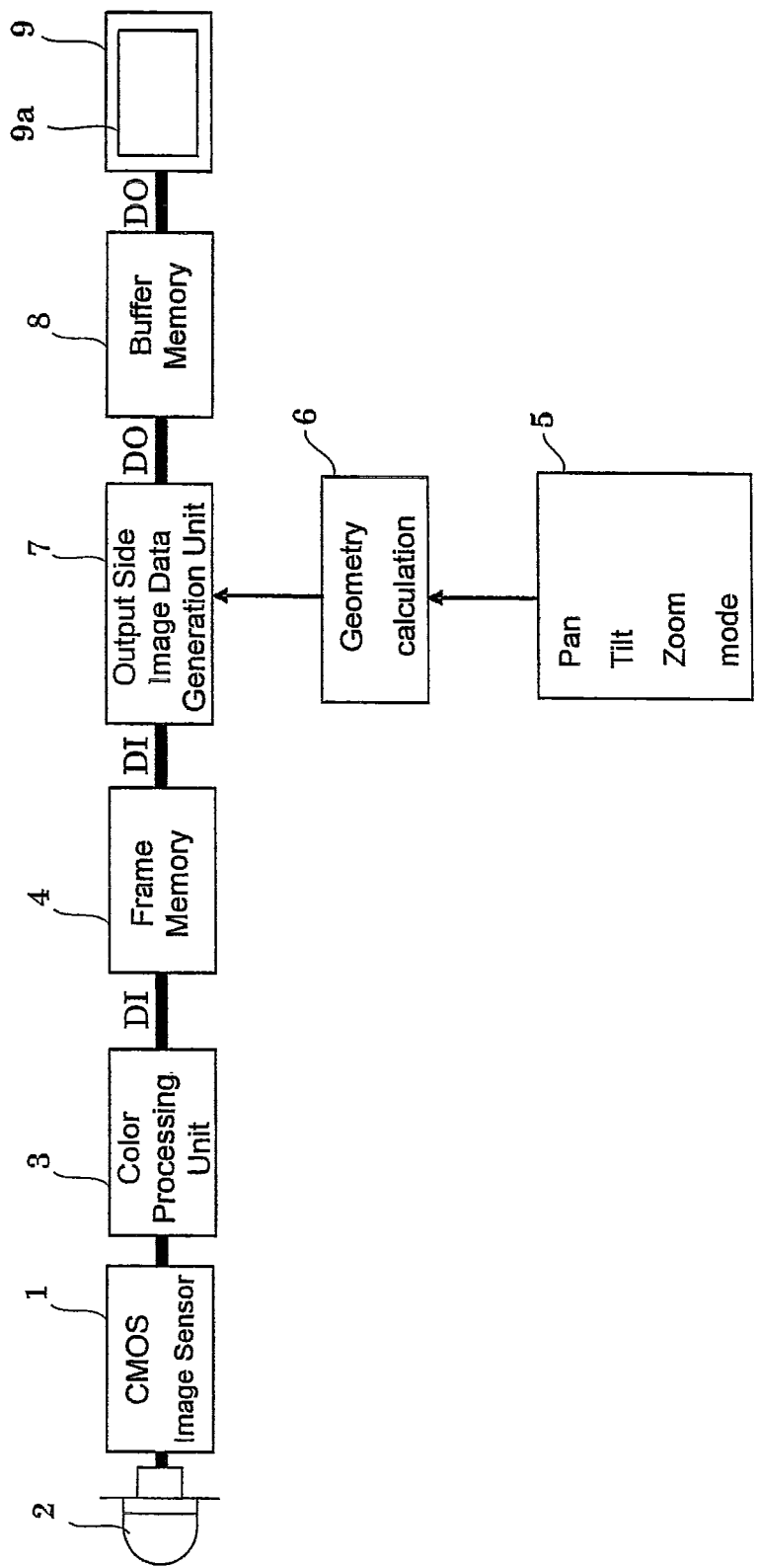
FIG. 14 is a block diagram showing an omnidirectional camera system according to a conventional technology.

FIG. 1 is a block diagram showing an omnidirectional camera system according to a first embodiment of the present invention. In this drawing, the same portions as those in FIG. 14 are assigned the same numerals as those in FIG. 14. As shown in FIG. 1, a CMOS image sensor 1, which is an imaging means, forms image data as an electrical signal based on a wide-angle image captured by a fish-eye lens 2. This image data is an electrical digital signal having a distortion component remaining as such when captured by the fish-eye lens 2. This signal is subjected to predetermined color processing at a color processing unit 3. The color processing unit 3 forms input side image data DI in pixels from the output signal of the image sensor 1 in a layered arrangement. As a result, an address matching device 13 is supplied with the input side image data DI which is a combination of brightness information and color information per pixel.

A parameter setting device 5 has settings of parameters concerned with pan, tilt, zoom and rotation for cutting out a region to be displayed, in the image captured by the fish-eye lens 2, and parameters related to the center and radius of the fish-eye lens 2. The parameters about the pan, tilt and rotation are set as angular information, the parameter about the zoom is set as magnification information, and the parameters about the center and radius of the fish-eye lens 2 are set as positional information and numerical information.

Figure 2:
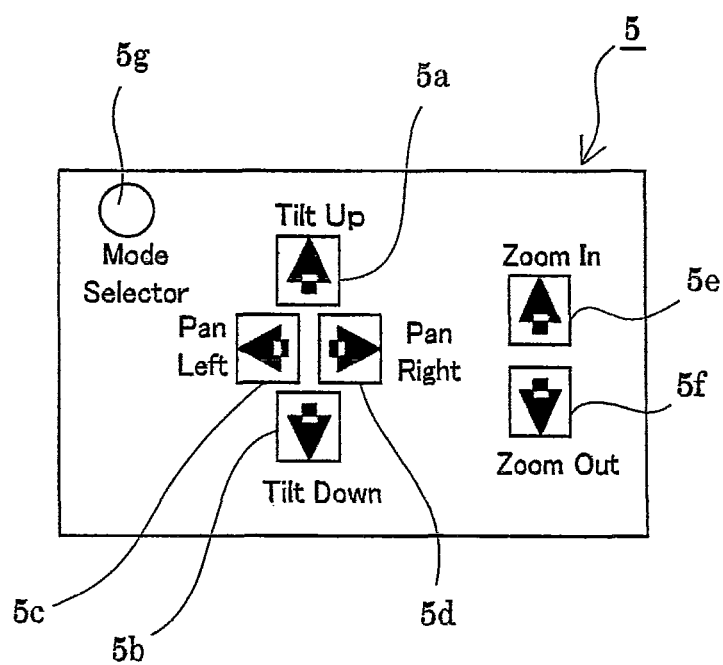
FIG. 2 is an explanation drawing conceptually showing the concrete configuration of a parameter setting device shown in FIG. 1.

FIG. 2 is an explanation drawing conceptually showing the concrete configuration of the parameter setting device 5 which functions as an input/output device in this case. As shown in the drawing, the parameters on the pan and tilt are set as angular information by operating operation buttons 5a, 5b, 5c, 5d. The parameter on the zoom is set by operating operation buttons 5e, 5f.

Figure 3:
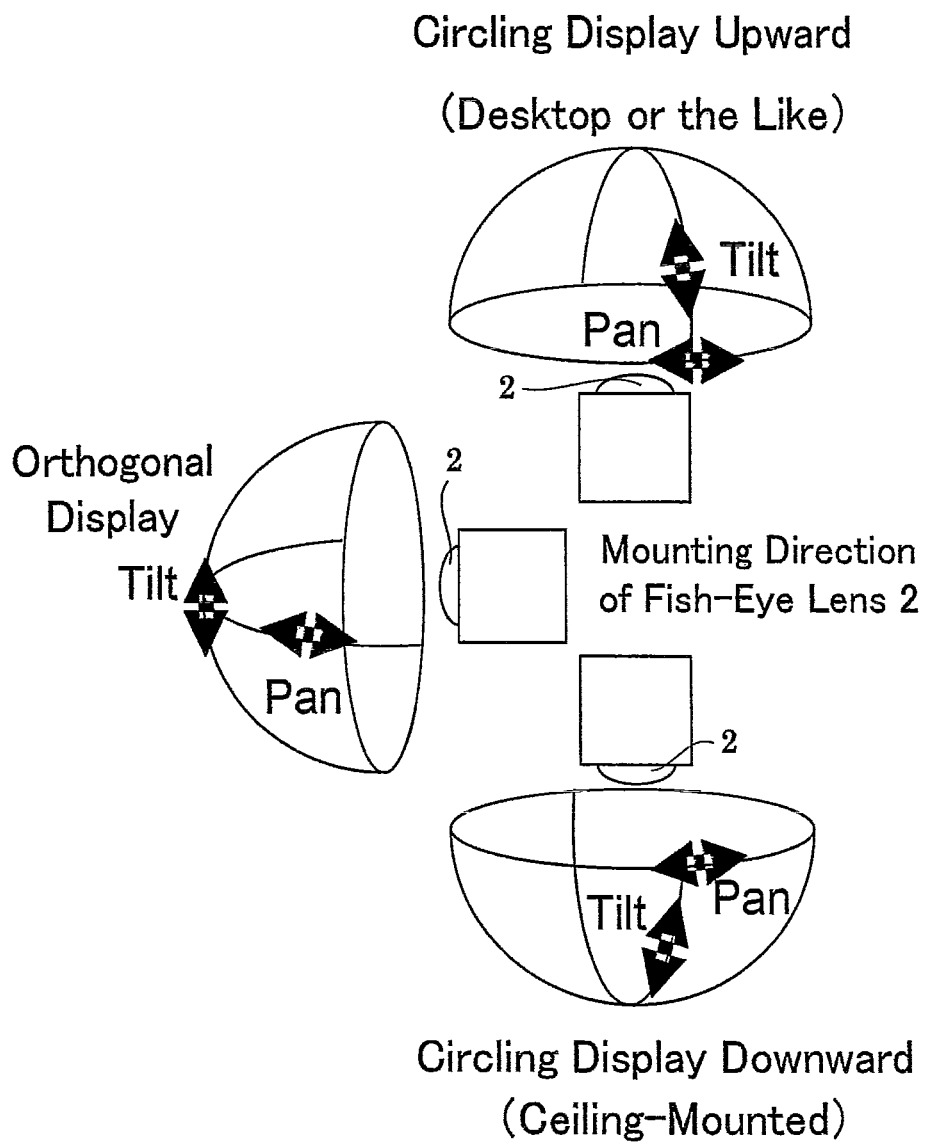
FIG. 3 is an explanation drawing conceptually showing display modes based on the method of installing a fish-eye lens shown in FIG. 1.

A mode selector button 5g selects a mode based on a difference in the method of installing the fish-eye lens 2. In more detail, as shown in FIG. 3, there are a circling display mode and an orthogonal display mode, depending on the method of installing the fish-eye lens 2. The circling display mode is classified as a circling display upward mode (desktop or the like) and a circling display downward mode (ceiling-mounted), and takes a picture, mainly, of the surroundings of the fish-eye lens 2. The orthogonal display mode is designed for taking a picture, with the optical axis being directed in the horizontal direction as with an ordinary camera. By selecting any of the respective modes, the method of coordinate development for the input to the fish-eye lens 2 can be changed for display.

A geometrical position calculation device 6 shown in FIG. 1 calculates the geometrical position of each pixel in the input side image data DI, which corresponds to each pixel on a display screen (output screen) 9a of a display device 9, in order to correct the distortion, by the fish-eye lens 2, of the image in the region to be cut out as an output based on the parameters set in the parameter setting device 5.

Figure 4:
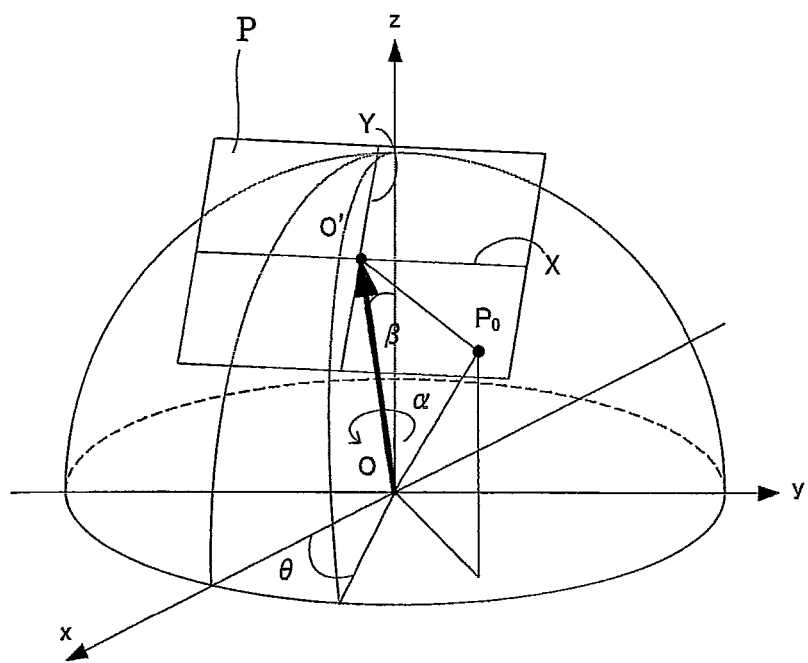
FIG. 4 is an explanation drawing for illustrating the principle of correction of a distortion in a geometrical position calculation device shown in FIG. 1.
Figure 5:
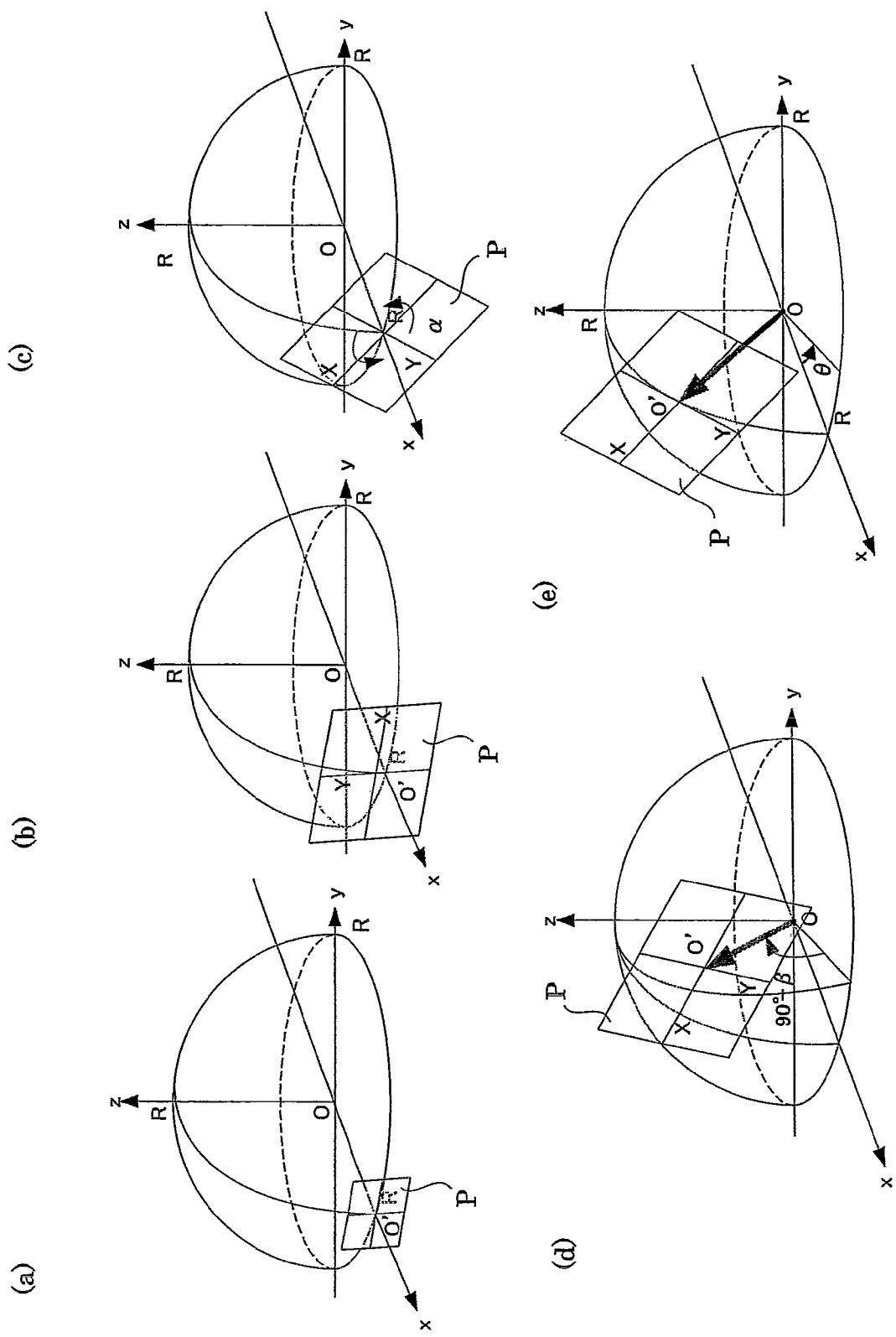
FIGS. 5(a) to 5(e) are explanation drawings for illustrating the procedural steps of a processing operation in the geometrical position calculation device shown in FIG. 1.

The calculation for correction of distortion in the geometrical position calculation device 6 can be performed suitably, for example, by making use of the following principle:

A circular image, which is formed on the surface of the image sensor 1 by the fish-eye lens 2, is equivalent to an image projected on a spherical screen of a hemispherical body with a radius R centered on the fish-eye lens 2. Thus, desired correction of distortion can be made, if the spherical image is converted into a flat image. That is, as shown in FIG. 4, it is advisable if light is projected from the center of the hemisphere, O, onto a tangential plane P tangent to the spherical surface, and the resulting flat image can be displayed as an output screen after correction of distortion.

Here, moving the eyepoint is equal to moving the tangential plane P, as the projection plane, on the spherical surface. The method of moving the tangential plane P comes in the following three types:

1) Rotation: Amount of rotation (α) about the eyepoint vector OO' of the tangential plane P
2) Tilt: Amount of angular movement (β) in the vertical direction of the eyepoint vector OO'
3) Pan: Amount of angular movement (θ) in the horizontal direction of the eyepoint vector OO'

A computation concerning the correction of distortion (coordinate transformation) is performed by the following procedure:

An XY coordinate system on the tangential plane P is transformed into an xyz coordinate system of the omnidirectional camera system, whereby the circular image of the fish-eye lens 2 is converted into a flat image.

Concretely, as shown in FIGS. 5(a) to 5(e), the tangential plane P is scaled up or down, and rotated or rolled in accordance with the following procedure, whereby its coordinate transformation is performed:

1) The barycenter O of the tangential plane P is placed at coordinates (R,0,0). At this time, the space coordinates of a point $P_0$ (X,Y) in the tangential plane P are (R,X,Y) (see FIG. 5(a)).
2) The tangential plane P is processed in accordance with a set zoom magnification to scale up or down the size of the tangential plane P to (1/zoom magnification) (see FIG. 5(b)).
3) The tangential plane P is rotated about the x-axis by α rad (rotation angle) from the y-axis toward the z-axis (see FIG. 5(c)).
4) The tangential plane P is rotated about the y-axis by (90°−β) rad (tilt angle) from the x-axis toward the z-axis (see FIG. 5(d)).
5) The tangential plane P is rotated about the z-axis by θ rad (pan angle) from the x-axis toward the y-axis (see FIG. 5(e)).

If the destination of movement of the given point $P_0$ (X,Y) on the tangential plane P (see FIG. 4) is $P_1(X_1,Y_1,Z_1)$ as a result of the above procedure, $P_1$ is expressed by the following equation using a rotation matrix:

$$\begin{bmatrix} X_1 \\ Y_1 \\ Z_1 \end{bmatrix} = \underbrace{\begin{bmatrix} \cos\theta & -\sin\theta & 0 \\ \sin\theta & \cos\theta & 0 \\ 0 & 0 & 1 \end{bmatrix}}_{PAN} \underbrace{\begin{bmatrix} \cos(90°-\beta) & 0 & -\sin(90°-\beta) \\ 0 & 1 & 0 \\ \sin(90°-\beta) & 0 & \cos(90°-\beta) \end{bmatrix}}_{TILT} \quad \text{[Equation 1]}$$

$$\underbrace{\begin{bmatrix} 1 & 0 & 0 \\ 0 & \cos\alpha & -\sin\alpha \\ 0 & \sin\alpha & \cos\alpha \end{bmatrix}}_{ROLL} \underbrace{\begin{bmatrix} 1 & 0 & 0 \\ 0 & 1/\text{Zoom} & 0 \\ 0 & 0 & 1/\text{Zoom} \end{bmatrix}}_{Zoom} \begin{bmatrix} R \\ X \\ Y \end{bmatrix}$$

The fish-eye lens 2 takes a surrounding 360-degree scene into its fish-eye circle to form a fish-eye image. Generally, the fish-eye lens 2 has image height characteristics, which are inherent distortion characteristics, with respect to an incident angle θ. That is, as shown in FIG. 6(a), the given point $P_1$ as a subject point on the tangential plane P (see FIGS. 4 to 5(a)-5(e)) and the focused point Q of the fish-eye image in the fish-eye circle 2a are correlated with each other by the image height characteristics. Thus, a distance OQ in FIG. 6(a) is called an image height h, and this image height h takes a specific value with respect to the incident angle θ for each fish-eye lens 2 in accordance with the distortion characteristics of the fish-eye lens 2.

FIG. 6(b) is an explanation drawing showing an example of the image height characteristics. As shown in this drawing, specifying the incident angle θ enables the image height h corresponding to the incident angle θ to be determined by a relevant image height characteristics curve (a thick line in the drawing).

Here, as shown in FIG. 6(c), the distance $OP_1$ between the center O and the point $P_1$ is given by the following equation:

$$OP_1 = \sqrt{X_1^2 + Y_1^2 + Z_1^2} \quad \text{[Equation 2]}$$

Thus, the incident angle θ from the point $P_1$ $(X_1,Y_1,Z_1)$ is given by the following equation:

$$\theta = \arccos\frac{Z_1}{OP_1} = \arccos\frac{Z_1}{\sqrt{X_1^2+Y_1^2+Z_1^2}} \quad \text{[Equation 3]}$$

As a result, the image height h can be found based on the incident angle θ obtained by the above equation and the image height characteristics shown in FIG. 6(b).

Then, a point $P_1'$ shown in FIG. 6(c) (i.e., a point obtained by projecting the point $P_1$ onto the xy-plane) is scaled up or down to the position of the image height h to find the coordinates (x,y) of the focused point Q shown in FIG. 6(a). Concretely, the coordinates of the focused point Q are determined by the following equation using $OP_1' = OP_1 \cdot \sin\theta$:

$$x = \frac{X_1 h}{OP_1'} \quad y = \frac{Y_1 h}{OP_1'} \quad \text{[Equation 4]}$$

In this manner, the coordinates $(X_1, Y_1, Z_1)$ of the given point $P_1$ in the tangential plane P are transformed into the coordinates (x,y) of the focused point Q upon correction of the distortion involved. That is, it becomes possible to calculate the geometrical position of each pixel in the input side image data (the pixel corresponding to the point Q on the circular image), the pixel conformed to each pixel on the output screen (i.e., one corresponding to the given point on the tangential plane P). Here, the geometrical position in the present embodiment is found to decimal places.

An address table 10 shown in FIG. 1 stores table information which is combined information correlating an input side address, as the address of each pixel on the input side image data DI based on the calculation results of the geometrical position calculation device 6, to an output side address as a reference which is the address of each pixel on the output screen.

A matching sort unit 11 rearranges or sorts the output side addresses, stored in the address table 10, according to the respective input side addresses (a concrete method for this work will be described in detail later).

A matching address table 12 stores table information which is combined information correlating the output side address to the input side address upon rearrangement in the matching sort unit 11.

Figure 7:
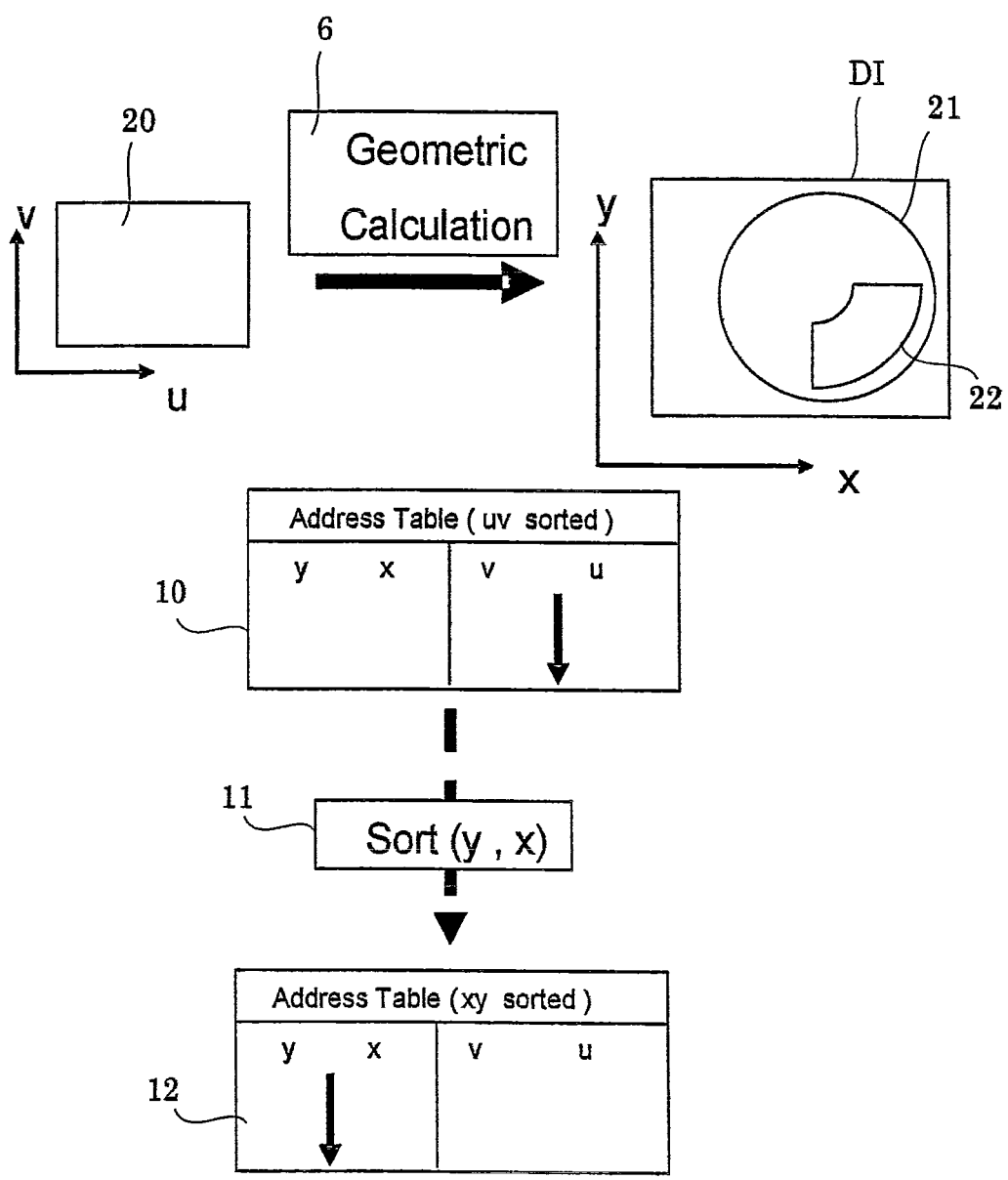
FIG. 7 is an explanation drawing conceptually showing the relationship among the geometrical position calculation device, an address table, a sort unit, and a matching address table shown in FIG. 1.

FIG. 7 is an explanation drawing conceptually showing the relationship among the geometrical position calculation device 6, the address table 10, the matching sort unit 11, and the matching address table 12. As shown in the drawing, the geometrical position calculation device 6 correlates the geometrical position of each pixel of the input side image data (xy plane) DI to the pixel on the output screen (uv plane) 20 as a reference. As a result, in the address table 10, the input side addresses based on the geometrical positions are arranged correspondingly in the sequence of the pixels on the output screen 20, namely, in the sequence of the output side addresses. In FIG. 7, a circular region 21 in the input side image data DI is a region corresponding to the visual field of the fish-eye lens 2, and a fan-shaped region 22 in the circular region 21 is a cut-out region, namely, the region corresponding to the output screen 20.

The matching sort unit 11 rearranges the output side addresses in the sequence of the input side addresses. As a result, the output side addresses correlated to the input side addresses as a reference after sorting are arranged in the matching address table 12.

FIGS. 8(*a*) to 8(*g*) are explanation drawings conceptually showing a concrete example of processing by the matching sort unit 11. This example illustrate a method called bit sorting, and shows a mode in which the input side address data of 5 bits initially arranged in the vertical direction in the drawing in the sequence shown in FIG. 8(*a*) (i.e., the data at the geometrical position) are rearranged in ascending order as shown in FIG. 8(*f*). With the present method, the state of "0" or "1" of the digits is detected, starting with a lower-order digit, and the data are rearranged, as appropriate. That is, when the data in FIG. 8(*a*) are rearranged in ascending order, with attention being focused on the lowest-order bit, the data as in FIG. 8(*b*) are obtained. If the data in this state are rearranged in ascending order, with the second bit being focused on, the data as in FIG. 8(*c*) are obtained. Then, the same procedure is repeated, with attention being paid to the third bit (FIG. 8(*c*)), the fourth bit (FIG. 8(*d*)), and the fifth bit (FIG. 8(*e*)), whereby sorting as shown in FIG. 8(*f*) can be finally carried out.

FIG. 8(*g*) is a block diagram showing an example of achieving the above-described sorting by hardware configuration. As shown in the drawing, all the above input side address data are initially written into an input buffer 31. That is, the state shown in FIG. 8(*a*) is formed. In this state, the lowest-order bit is first given attention. If it is "0", a selector 32 writes the corresponding input side address data from the left side of an output buffer 33. If it is "1", the selector 32 writes the corresponding input side address data from the right side of the output buffer 33. These actions are performed sequentially. As a result, a state corresponding to FIG. 8(*b*) is formed in the output buffer 33. In this state, the functions of the input buffer 31 and the output buffer 33 are reversed. Then, the second bit is given attention, and the same procedure is repeated to form a state corresponding to FIG. 8(*c*). Afterwards, the same procedure is repeated between the input buffer 31 and the output buffer 33, whereby the state shown in FIG. 8(*f*) can be formed finally.

Figure 9:
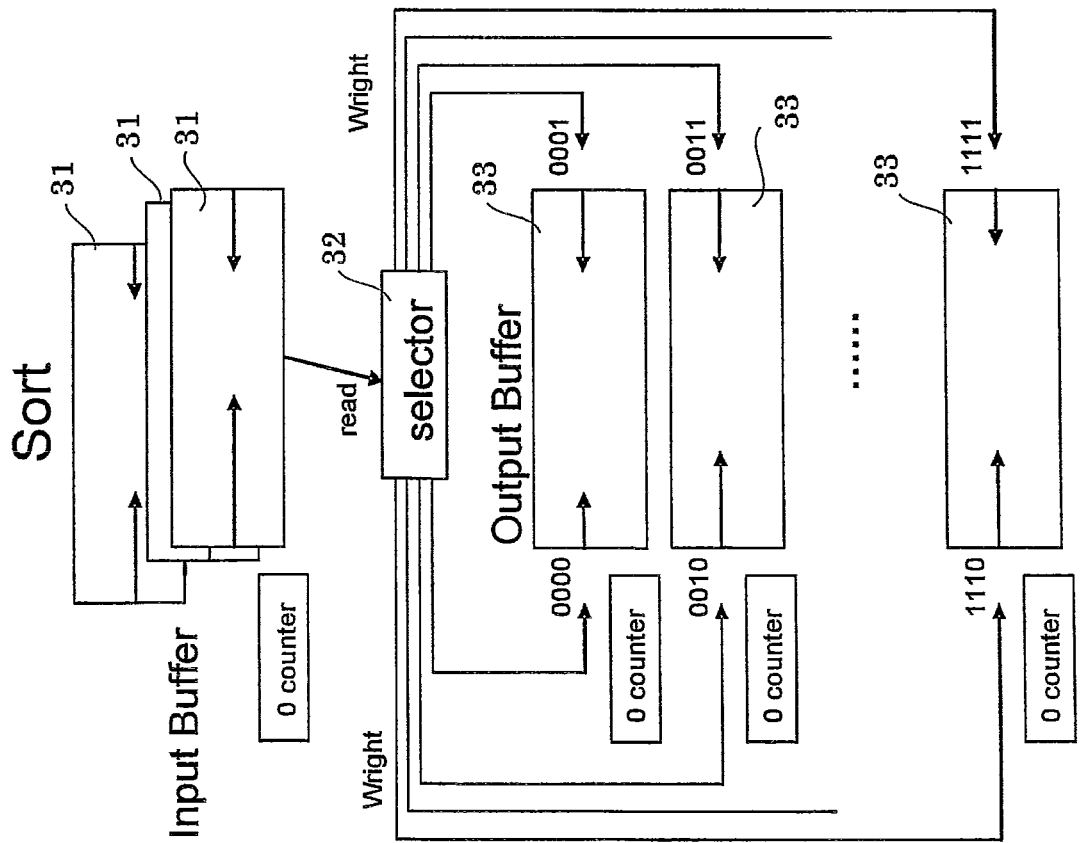
FIG. 9 is an explanation drawing conceptually showing the hardware configuration of a multi-bit processing mode for realizing sorting in the sort unit shown in FIG. 1.

FIG. 9 shows the hardware configuration of FIG. 8(*g*) which is composed of 8 of the input buffers 31 and 8 of the output buffers 33. Such a parallel configuration enables bit sorting to be performed 4 bits at a time. Since the number of readings and writings is reduced to ¼, the processing speed can be quadrupled. Generally, the parallel configuration of $2^n$ of the input and output buffers 31 and 33 can increase the processing speed n-fold. Thus, the numbers of the input and output buffers 31 and 33 may be determined in agreement with the desired processing speed.

The address matching device 13 shown in FIG. 1 consists of an address matching unit 14 and an output side image data generation unit 15. Of these units, the address matching unit 14 checks the input side address of each pixel of the input side image data DI, which has been sent out by the color processing unit 3 and loaded in real time, against the input side address stored in the matching address table 12, and detects whether they are coincident or not. When both input side addresses in the address matching unit 14 are coincident, the output side image data generation unit 15 combines the input side image data DI at the input side address with the corresponding output side address to form output side image data DO.

The output side image data DO formed in the output side image data generation unit 15 is one obtained by eliminating the distortion of the input side image data DI based on the information on the geometrical position. The output side image data DO is sequentially stored in a buffer memory 8 as data which is a sequential combination of brightness information and color information based on the input side image data DI for each pixel. This combined data is reproduced, frame by frame, on the display screen (output screen) 9*a* of the display device 9 via a read-out circuit 16.

In the present embodiment, each time the results of the above checking (matching) are coincident, the output side image data DO is written randomly into the buffer memory 8, with the output side address as a reference. The readout of the output side image data DO is performed sequentially via the read-out circuit 16. A detailed description will be offered later in connection with these points.

In this manner, the image in the predetermined cut-out region (fan-shaped region 22), the image corrected for distortion, is reproduced on the display screen 9*a*.

According to the present embodiment, the address matching device 13 checks the input side address of each pixel of the input side image data DI, which has been loaded in real time, against the input side address stored in the matching address table 12. When both input side addresses are coincident, the input side image data DI at the coincident input side address is combined with the corresponding output side address in the output side image data generation unit 15 to form the output side image data DO.

In the present embodiment, the matching sort unit 11 is provided to rearrange the output side addresses in the sequence of the input side addresses, so that the predetermined address matching in the address matching unit 14 can be carried out rationally. This is because the input side addresses in the matching address table 12 are arranged in the sequence of the input side image data DI inputted to the address matching unit 14, and single retrieval is enough to bring all the pixels of the output side image data DO into correspondence with one pixel of the input side image data DI.

FIGS. 10(*a*) and 10(*b*) are explanation drawings conceptually showing the further detailed functions of the address matching device 13 and the buffer memory 8. FIG. 10(*a*) shows the corresponding relationship between the input side address (y,x) of the input side image data DI read out in the sequence of the addresses in the image sensor 1 and the corresponding output side image data DO. On the other hand, FIG. 10(*b*) shows the matching action in the address matching unit 14, and the mode of generation of, and the manner of writing into the buffer memory 8 of, the output side image data DO in the output side image data generation unit 15.

As shown in FIG. 10(*b*), the address matching unit 14 checks the input side address of the input side image data DI, sequentially read out in real time, against the input side address (y,x) stored in the matching address table 12. Since the input side address (y,x) in the matching address table 12 in the present embodiment has a fractional part, a judgment is made with its whole number part as a reference. Concretely, the contents of a line counter 41 representing the y-coordinate of the input side address of the input side image data DI and the contents of a column counter 42 representing the x-coordinate thereof are compared. Here, the y-coordinate of the line counter 41 and the x-coordinate of the column counter 42 are given as integer values.

The output side image data generation unit 15 selects a total of 4 pixels including the pixel at the coincident address and pixels in the vicinity of this pixel, namely, respective pixel data on the pixel at the input side address (y,x), the input side address (y, x−1) adjacent on the same line to the pixel at the input side address (y,x), and the input side addresses (y−1, x−1) and (y−1, x) adjacent one line ahead to them, and forms each pixel data DO-1 for the output side image data DO from the total 4 pixels designated as 43. Thus, the output side image data generation unit 15 has a line buffer memory 44 for storing the one line equivalent of data. In forming the each pixel data DO-1 as stated above, brightness with respect to the adjacent pixel is found by linear interpolation based on the value of the fractional part of the input side address (y,x) in the matching address table 12. Here, the interpolation need not be limited to linear interpolation, if it is an interpolation weighted with the value of the fractional part. The each pixel data DO-1 also contains color information generated based on the four pixels 43, although this is not shown.

The each pixel data DO-1 formed in the output side image data generation unit 15 is written into the buffer memory 8. In this case, whenever the each pixel data DO-1 is formed, it is written randomly into the buffer memory 8, with the output side address as a reference. Thus, the buffer memory 8 has the each pixel data DO-1 written thereinto in a state in which these data are arranged sequentially in the sequence of the output addresses. As a result, the readout of the each pixel data DO-1 is performed sequentially, beginning at the start of the buffer memory 8.

SECOND EMBODIMENT

In the first embodiment shown in FIG. 1, the each pixel data DO-1 are arranged in the sequence of the output side addresses in the buffer memory 8, as mentioned above. The configuration for readout of the each pixel data DO-1 can be simplified accordingly.

In writing the each pixel data DO-1 formed in the output side image data generation unit 15 into the buffer memory 8, the writing is carried out randomly, with the output side addresses as a reference. In writing the each pixel data DO-1 corresponding to the peripheral portion of the fan-shaped region 22 (see FIG. 10 (*a*)) with great distortion in the input side image data DI, therefore, it becomes difficult to ensure a sufficient writing speed, or in some cases, it becomes impossible to carry out writing. The reason is that in the case of the each pixel data DO-1 in a region corresponding to the above peripheral portion, the data may be intermingled, and the writing interval may exceed the writing capacity of the buffer memory 8, causing an overflow.

The present embodiment is designed to avoid such a writing disabling state, and differs from the embodiment of FIG. 1 in the manner of writing into and reading from the buffer memory 8. That is, each time the each pixel data DO-1 is formed, it is written sequentially into the buffer memory 8, whereas the data is read out of the buffer memory 8 randomly.

Figure 11:
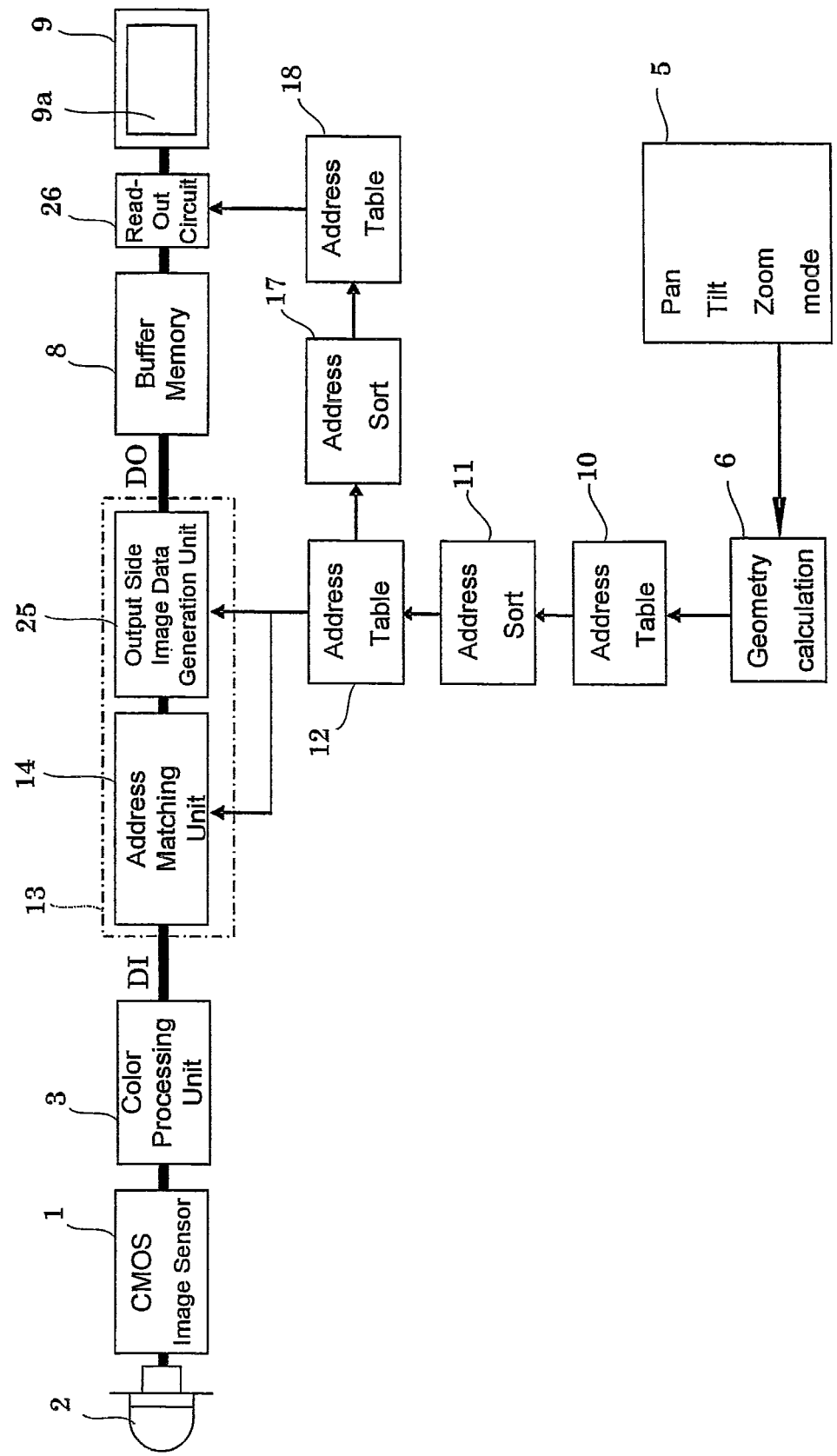
FIG. 11 is a block diagram showing an omnidirectional camera system according to a second embodiment of the present invention.

FIG. 11 is a block diagram showing an omnidirectional camera system according to a second embodiment of the present invention. In this drawing, the same portions as those in FIG. 1 are assigned the same numerals as those in FIG. 1, and duplicate explanations are omitted. In the present embodiment, output side image data DO formed by an output side image data generation unit 25 are sequentially written into a buffer memory 8 each time they are formed. On the other hand, the output side image data DO are read out randomly from the buffer memory 8 via a read-out circuit 26 by reference to a read-out address table 18, and reproduced on a display screen 9*a* of a display device 9.

The read-out address table 18 stores table information which is combined information obtained by correlating a memory address of the buffer memory 8 to an output side address as a reference upon sorting by a read-out sort unit 17. The read-out sort unit 17 rearranges the memory addresses of the buffer memory 8 based on the output side addresses stored in a matching address table 12.

According to the present embodiment, writing of the output side image data DO into the buffer memory 8 is performed sequentially, so that an overflow of written information as in random writing does not occur. Instead, the buffer memory 8 has the output side image data DO randomly written thereinto, so that the data need to be read out randomly in the sequence of the output side addresses. Information for such readout is in storage at the read-out address table 18. Thus, by reference to the contents of storage in the read-out address table 18, random readout can be carried out in the sequence of the output side addresses, as determined beforehand. This point will be described in further detail based on FIG. 12.

Figure 12:
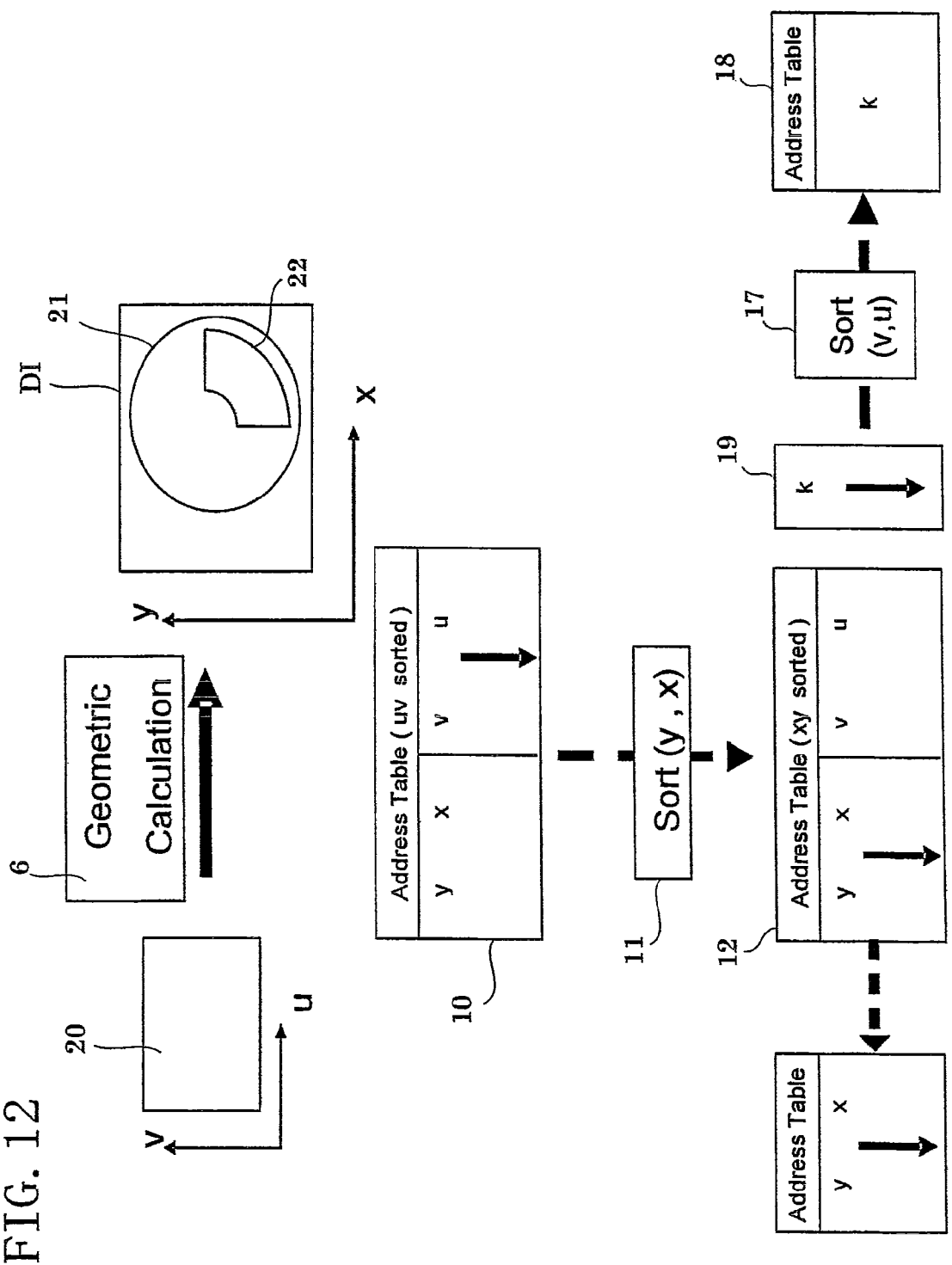
FIG. 12 is an explanation drawing conceptually showing the relationship among a geometrical position calculation device, an address table, a sort unit, and a matching address table shown in FIG. 11.

FIG. 12 is an explanation drawing conceptually showing the relationship among the geometrical position calculation device, the address table, the sort unit, and the matching address table shown in FIG. 11. This drawing corresponds to FIG. 7 in the first embodiment. Thus, the same portions as those in FIG. 7 are assigned the same numerals as those in FIG. 7, and duplicate explanations are omitted.

As shown in FIG. 12, the aforementioned matching is carried out using the input side address table (y,x) of the matching address table 12. On the other hand, the read-out address table 18 is prepared using the output side address table (v,u) of the matching address table 12. That is, a comparative table containing the output side addresses of the output side address table (v,u) arranged in the sequence of an address number table 19 of the buffer memory 8 is prepared. Then, a read-out sort unit 17 rearranges the address numbers in the comparative table according to the output side addresses as a reference, whereby a table describing the addresses of the buffer memory 8 corresponding to the output side addresses can be prepared. This table is stored in the read-out address table 18, and random readout based on this information makes it possible to reproduce the output side image data DO arranged sequentially.

Figure 13:
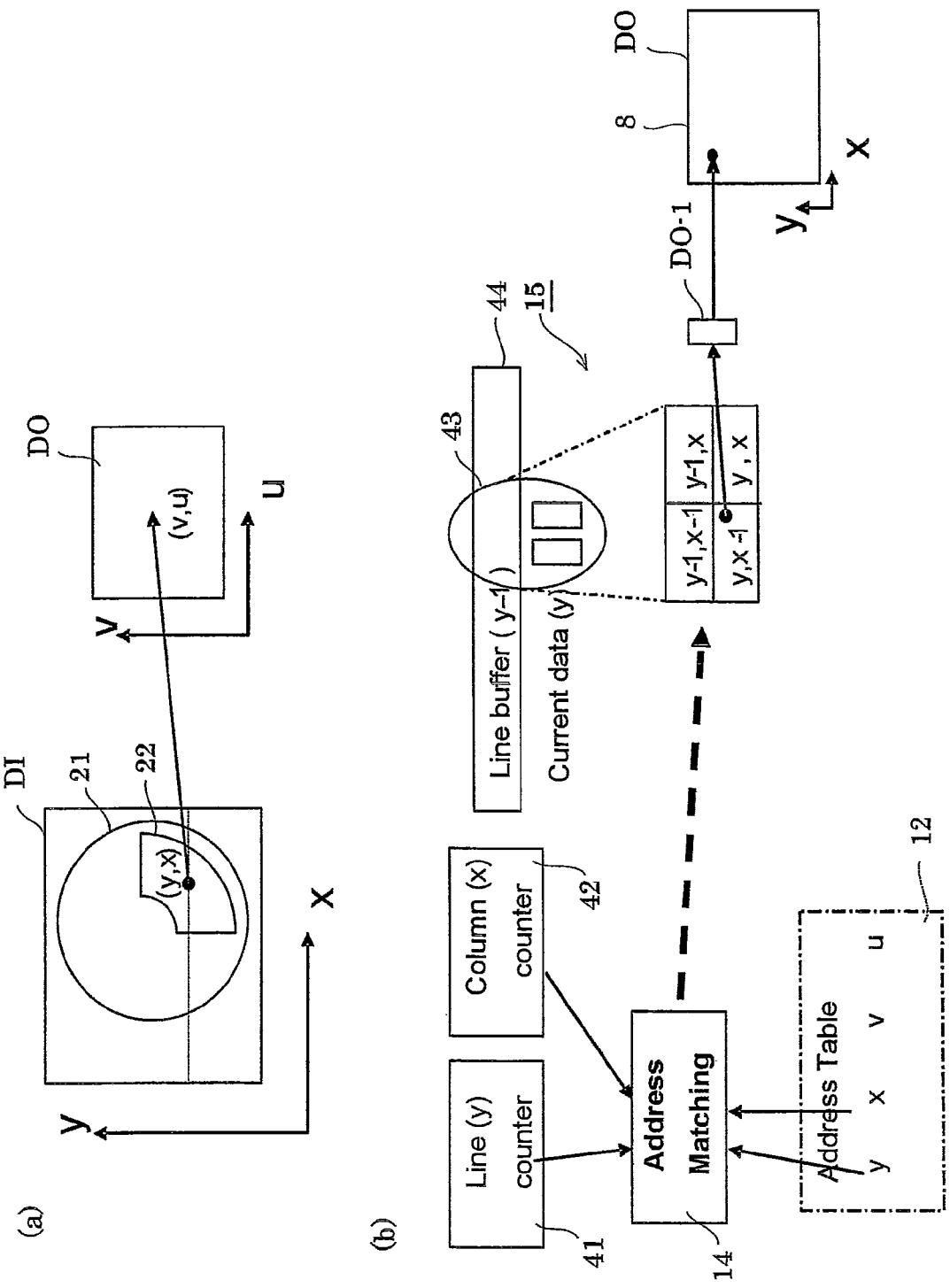
FIGS. 13(a) and 13(b) are explanation drawings conceptually showing the functions of an address matching device and a buffer memory shown in FIG. 11.

FIGS. 13(*a*) and 13(*b*) are explanation drawings conceptually showing the functions of the address matching device and the buffer memory shown in FIG. 11. This drawing corresponds to FIG. 10 in the first embodiment. Thus, the same portions as those in FIG. 10 are assigned the same numerals as those in FIG. 10, and duplicate explanations are omitted. FIG. 13 shows that each time the each image data DO-1 is formed in the output side image data generation unit 15, it is sequentially written into the buffer memory 8, beginning with the start of the buffer memory 8.

According to the present embodiment, as described above, loading into the buffer memory 8 can be performed sequentially, so that an overflow of data when read in can be avoided. For readout, by contrast, data need to be read out randomly. In this case, however, the interval for readout is constant, so that an overflow of information is not caused.

In the above first and second embodiments, the matching sort unit 11 is provided to rearrange the output side addresses in the sequent of the input side addresses, but sorting need not necessarily be performed. Although the number of retrievals for matching is increased, the present invention includes a case where no sorting is performed. That is, the mere provision of the address table 10 and the address matching device 13 makes it possible to construct a camera system rid of the frame memory 4 (FIG. 14) used in the conventional technology, although the efficiency of matching is reduced.

Also, table information on a specific region is stored in an address table having the same functions as those of the address table 10. Moreover, the respective output side addresses are rearranged beforehand in correspondence with the respective input side addresses. By these measures, the same table information as the sorted table information stored in the matching address table 12 can be stored in connection with the above specific region. In this case, therefore, rational matching comparable to address matching involving the matching sort unit 11 can be performed in connection with the above-mentioned specific region.

If a plurality of the above specific regions are set, and sorted table information as mentioned above is stored for each of the regions, rational matching can be performed in regard to each of the regions. In this case, control may be exercised such that the respective regions are automatically switched as appropriate.

In the aforementioned first and second embodiments, moreover, the each pixel data DO-1 for the output side image data DO is formed with the use of the pixels located one line ahead. Thus, the line buffer memory 44 covering one line is provided. If only the input side address adjacent on the same line is utilized, however, the line buffer memory 44 naturally becomes unnecessary. The provision of the line buffer memories enough for two lines or more, on the other hand, can form high accuracy output side image data DO utilizing information on correspondingly many input side addresses. Hence, the number of the line buffer memories may be selected in consideration of the accuracy of a reproduced image.

The aforementioned first and second embodiments have the fish-eye lens 2 as their lens. Thus, the calculation in the geometrical position calculation device 6 is designed to correct the distortion of the input side image data DI by the fish-eye lens 2, but this processing is not limitative. Processing for imparting a desired distortion to distortion-free input side image data DI taken in by an ordinary lens is also included in the present invention. That is, the geometrical position calculation means includes not only the correction of distortion of an image incorporated by the lens, but also processing such as correction for distorting an undistorted image. It is essential that no particular limitation be imposed on processing, if it transforms the geometrical position of an image taken in by a lens.

The invention claimed is:

1. A method, comprising:
providing a digital signal representative of an image captured through a lens;
extracting a region to be displayed from the image by setting at least one parameter, wherein the at least one parameter includes one or more of a pan parameter, a tilt parameter, a zoom parameter or a rotation parameter;
transforming a geometrical position of an object in the region based on the parameter, wherein the geometrical position of the object is transformed by calculating a geometrical position of each of a plurality of pixels of input side image data, the each pixel of the input side image data corresponding to one of a plurality of pixels on an output screen;
storing information in an address table, wherein the information is obtained by correlating an input side address to an output side address, wherein the input side address corresponds to an address of the each pixel of the input side image data and is based on the geometrical position calculated for the each pixel of the input side image data, and the output side address corresponds to an address of the each pixel on the output screen; and
determining whether a real-time input side address of each pixel of the input side image data is coincident with a stored input side address that is stored in the address table; and
when the real-time input side address is coincident with the stored input side address:
combining the input side image data at the stored input side address with corresponding image data at the output side address to form output side image data; and
transmitting the output side image data in an output signal.

2. The method of claim 1, wherein storing the information in the address table comprises:
rearranging output side addresses calculated in relation to at least one specific region of the output screen in accordance with an arrangement of corresponding address input side addresses.

3. The method of claim 2, wherein storing the information in the address table comprises:
storing portions of table information in the address table, wherein output side addresses in portions of the table information are rearranged according to input side addresses in relation to the at least one specific region.

4. The method of claim 1, wherein calculating the geometrical position of each of the plurality of pixels of input side image data comprises:
providing the input side address as a decimal value.

5. The method of claim 4, wherein determining whether the real-time input side address is coincident with a stored input side address comprises:
selecting as a reference, a specific pixel corresponding to a whole number part of the input side address in the input side image data;
determining a brightness of the specific pixel by weighted interpolation using a value of a fractional part of the input side address based on brightness of a plurality of pixels adjacent to the specific pixel; and
establishing the brightness of the specific pixel as brightness of a pixel in the output side image data corresponding to the specific pixel.

6. The method of claim 5, wherein at least one line equivalent of data is stored in a buffer memory, and wherein determining whether the real-time input side address is coincident with a stored input side address comprises:
determining the brightness of the specific pixel belonging to a next line using brightness information associated with each pixel stored in the buffer memory.

7. The method of claim 1, further comprising:
storing the output side image data in a buffer memory into which the output side image data is written randomly using the output side address as a reference,
wherein the output side image data is stored whenever the real-time input side address of the each pixel is determined to be coincident with the stored input side address, and
wherein the output side image data is read from the buffer memory sequentially.

8. The method of claim 1, further comprising:
storing the output side image data in a buffer memory into which the output side image data is written sequentially whenever the real-time input side address of the each pixel is determined to be coincident with the stored input side address;

rearranging memory addresses of the buffer memory in accordance with the output side addresses; and storing table information in a read-out address table, wherein the table information stored in the read-out address table is obtained by correlating the memory addresses of the buffer memory to the output side addresses after rearranging the memory addresses of the buffer memory, and wherein transmitting the output side image data is performed randomly based on the table information of the read-out address table.

9. The method of claim 1, wherein the lens comprises a fish-eye lens having a wide-angle visual field.

10. The method of claim 9, wherein transforming the geometrical position of the object in the region comprises:
correcting distortion of the image in the region.

11. The method of claim 1, wherein transforming the geometrical position of the object in the region comprises:
distorting the image in the region.

12. An image processing method, comprising:
extracting a region for display from an image captured by a lens based on one or more parameters, the one or more parameters including a parameter associated with one of pan, tilt, zoom or rotation;

transforming a geometrical position of an object in the region based on the parameter, including transforming geometrical position of each pixel in input image data obtained from an imaging device, wherein the each pixel corresponds to a pixel on an output display, and wherein the geometrical position of the each pixel in input image data based on an output signal of an imaging device;

storing table information in an address table, wherein the table information comprises a combination of information obtained by correlating an input side address with an output side address, wherein the input side address comprises an address of the each pixel of input side image data based on a calculated geometrical position and the output side address comprises a reference address corresponding to an address of the each pixel on the output display;

determining whether a real time input side address of the each pixel of the input side image data is coincident with the input side address stored in the address table;

combining the input side image data at the input side address with the corresponding output side address to form output side image data when the real time input side address is coincident with the input side address; and transmitting the output side image data.

13. A method, comprising:
providing a digital signal representing an image captured by a lens;

extracting a region to be displayed in the image by setting a parameter related to at least one of pan, tilt, zoom and rotation;

calculating a geometrical position of each pixel in input side image data, the each pixel corresponding to each pixel on an output screen, wherein a predetermined transformation of a geometrical position of an object in the region is performed based on the parameter;

storing table information in an address table, wherein the table information comprises information obtained by correlating an input side address to an output side address, wherein the input side address comprises an address of the each pixel of the input side image data based on the calculated geometrical position, and wherein the output side address comprises an address of the each pixel on the output screen;

rearranging the output side addresses stored in the address table according to the input side addresses;

storing in an address table, information obtained by correlating the output side addresses to the input side addresses after the output side addresses have been rearranged; and determining whether a real time version of the input side address of the each pixel of the input side image data is coincident with the input side address stored in the address table;

combining the input side image data at the input side address with the corresponding output side address to form output side image data; and transmitting the output side image data.

14. The method of claim 13, wherein the table information stored in the address table comprises information which includes output side addresses based on calculated geometrical positions of pixels related to a specific region, wherein the output side addresses are rearranged in accordance with the input side addresses.

15. The method of claim 13, wherein the address table stores information in which the output side addresses are rearranged in accordance with the input side addresses related to a plurality of specific regions.

* * * * *